Sept. 8, 1942.   B. C. EBERHARD ET AL   2,295,392
VALVE
Filed Sept. 5, 1941
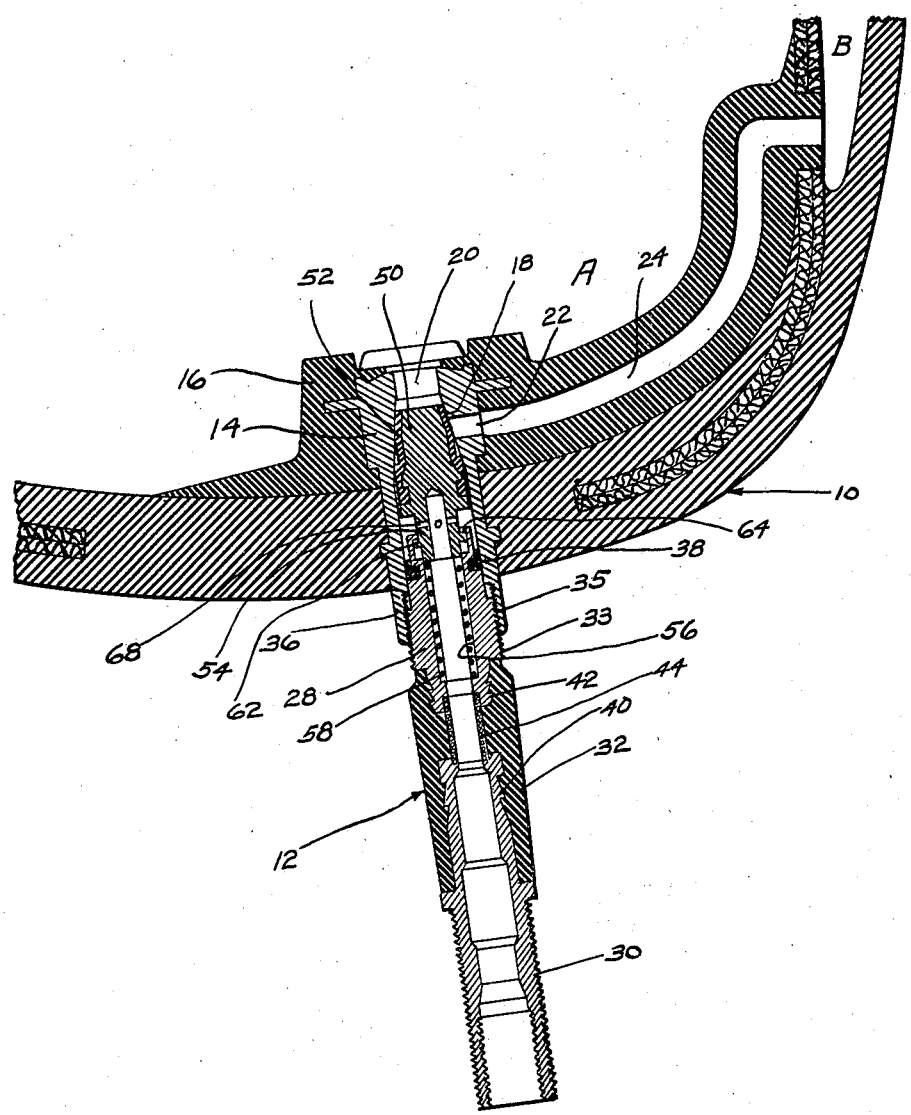
Inventor
Boyd C. Eberhard and
Selden T. Williams
By
Attorney Patented Sept. 8, 1942

2,295,392

UNITED STATES PATENT OFFICE 2,295,392

VALVE

Boyd C. Eberhard, Akron, Ohio, and Selden T. Williams, Bellerose, N. Y., assignors to Wingfoot Corporation, Wilmington, Del., a corporation of Delaware Application September 5, 1941, Serial No. 409,628

4 Claims. (Cl. 251—46)

This invention relates to valves for fluid-filled tires or tubes, and, more particularly, is concerned with valves for use with plural-chambered safety tubes and the like.

Within recent years there has been considerable commercial acceptance and use of plural-chambered safety tubes for pneumatic tires employed upon automobiles, fire trucks, ambulances, police cars, airplanes, and other vehicles. Such safety tubes have generally taken the form of plural-chambered tubes which are adapted to resist blowout or sudden deflation and which permit the driver of the vehicle to maintain control of the vehicle and bring it to a stop, even though one of the chambers of the tube has been severely punctured. Usually, in plural-chambered tubes employed with vehicles running upon the ground the plural-chambered tubes are formed with vent or bleed openings between the chambers so that when one chamber is punctured the air or other fluid in the adjacent chambers bleeds gradually into the punctured chamber and causes a gradual deflation of the pneumatic tire carrying the safety tube. However, this type of safety tube is not adapted for use with airplanes or other vehicles which have pneumatic tires that engage with the ground only at periodic and often infrequent intervals. This is because if an airplane having a conventional type of safety tube should puncture one of the chambers upon taking off, the pneumatic tire would go flat in the air, usually without the knowledge of the pilot, and upon attempting to land the airplane a serious accident or considerable damage might well result. Therefore, it has been the practice in safety tubes employed on airplanes to provide no vent or bleed openings between the several chambers of the tube. Instead, the several chambers of the tube are sealed off positively from each other, and this is most conveniently accomplished by employing a valve in conjunction with the safety tube which permits rapid inflation of the several chambers of the tube but which thereafter can be quickly operated to seal the several chambers off from each other and from the atmosphere.

In the use of a safety tube for airplanes and employing a valve of the character generally described above, it has been found that the entire safety tube is often subjected to very considerable vibration. This vibration may be due to landing shocks, vibration of the airplane in the air due to normal motor vibration, or due to vibration set up by diving, high speed, or other causes. In any event the usual type of valve for a safety tube and including a valve seat and valve plug which are moved into sealing engagement with each other by screwing the valve stem into the valve casing, may become loosened by the vibration and the result is leakage of the valve and deflation of the safety tube. While such instances in actual use are very rare, they are particularly dangerous and objectionable for this very reason.

It is the general object of our invention to avoid and overcome the foregoing and other difficulties of and objections to prior known types of valves for safety tubes by the provision of an improved valve which is relatively inexpensive to construct, readily installed, quickly operated, adapted to a large number of opening and closing operations without excessive wear, and which serves indefinitely to positively seal the safety tube, even under intense and prolonged conditions of vibration.

Another object of our invention is to provide a valve for fluid-filled tires or tubes and wherein the valve plug and valve seat are moved relatively and into positive sealing engagement with each other and with the valve plug and seat being held together by compressed spring means in addition to the positive screw or other means normally serving to move the plug and seat together or apart.

Another object of our invention is the provision of a valve for use with safety tubes and the like and wherein the valve stem carries a valve plug, usually of conical shape, and having a tubular extension received within a counterbore formed in the valve stem. The counterbore receives a compression spring normally urging the valve plug outwardly of the valve stem, and means are incorporated with the valve stem for supporting the plug on the stem for rotatable and axial movement therein.

The foregoing and other objects of our invention are achieved by the provision of a valve comprising a valve casing a conical valve seat within the valve casing, said valve casing having a port extending laterally therethrough to approximately the middle of the valve seat and a port extending longitudinally through the small end of the valve seat, a valve stem received by the valve casing and adjustable axially therein, said valve stem including an inner metal portion, an outer metal portion, and a connecting rubber portion, a valve plug adapted to be removably engaged with the valve seat to seal the ports from each other and from the large end of the valve seat, and means for rotatably mounting the valve on the inner end of the inner metal portion of the valve stem so that the valve may yield resiliently in an axial direction, said valve stem and valve having associated passages for supplying fluid to or from the ports when the valve is off its seat.

More generally, our invention comprises a valve for use with fluid-filled tires or tubes and comprising a valve seat, a valve plug, screw means for effecting positive relative movement between the seat and the plug to open or close the valve, and spring means adapted to be compressed when the plug is forced into engagement with the seat and serving to hold the plug and seat together even though the screw means may be subjected to severe vibration tending to loosen the screw means.

For a better understanding of our invention reference should be made to the accompanying drawings wherein the single figure is a transverse sectional view through a plural-chambered safety tube in the region of the valve stem, with the greater portion of the safety tube being broken away.

Although the valve of our invention is broadly adapted for use in conjunction with fluid-filled tires and tubes of substantially any type or character, it is primarily adopted for use in conjunction with plural-chambered safety tubes, for example, of the type shown in Lee Patent No. 2,173,065, and, accordingly, our invention has been illustrated in conjunction with a tube of this general type and will be so described.

In the drawing, the numeral 10 indicates generally a plural-chambered safety tube (partly broken away) having an inner chamber A and a radial outer and surrounding chamber B. Associated with the safety tube is a valve, which is indicated as a whole by the numeral 12 and which includes a valve casing 14, generally made of metal, and secured by vulcanization or otherwise to a rubber pad 16 which is vulcanized or otherwise secured to the inside of the safety tube 10. The valve casing 14 has a valve seat 18 formed therein, and a longitudinally extending port 20 connects the small end of the valve seat 18 with the chamber A of the tube 10. The valve casing 14 is also formed with a laterally extending port 22 which opens to the valve seat 18 at a point usually about midway of the length of the valve seat. The port 22 is connected by a passage 24, formed in the rubber block 16 and a lateral arm thereof, to the chamber B of the tube 10.

Adjustably received within the valve casing 14 is a valve stem having an inner metal portion 28, an outer metal portion 30 and an interconnecting rubber portion 32. While various means may be provided for effecting axial movement of the valve stem into and out of the valve casing, one convenient manner of accomplishing the desired result is to provide male threads 33 on the outside of the inner metal portion 28 of the valve stem which engage with female threads 35 formed upon the inner surface of the short tubular extension 36 of the valve casing 14. Usually, we provide some means or method of sealing between the inner metal portion 28 of the valve stem and the valve casing 14. These means may comprise a gasket 38, ordinarily made of rubber, which is carried by a groove formed in the inner metal portion 28. The gasket 38 engages with the inner periphery of the extension 36 of the valve casing 14.

The outer metal portion 30 of the valve stem is adapted to receive the usual or standard type of valve insides or insert, which, for purposes of simplification has not been illustrated in the drawing. The outer and inner metal portions of the valve stem are formed with tubular extensions 40 and 42 respectively of reduced diameter and having flanged peripheries so that the connecting rubber portion 32 may be securely vulcanized to the inner and outer metal portions. The connecting rubber portion 32 of the valve stem may be strengthened by a helically coiled wire spring or lining 44 which is received in short counterbores formed in the ends of the extensions 40 and 42 of the outer and inner metal portions 30 and 32.

The valve stem rotatably and resiliently supports a valve, or more specifically a valve plug 50, usually having a truncated conical shape and covered by a layer of relatively stiff rubber 52 which is vulcanized to the valve plug. The valve plug 50 includes a tubular extension 54, generally formed integrally with the valve plug and which is received within a counterbore 56 formed in the bore of the inner metal portion 28 of the valve stem. A compression spring 58 is received within the bore 56 and engages with the end of the tubular extension 54 of the valve plug 50. Thus, the valve plug 50 is normally urged outwardly of the valve stem by means of the compression spring 58.

In order to rotatably support the valve plug 50 on the end of the valve stem and to provide for relative axial movement the tubular extension 54 of the valve plug 50 is formed with an outwardly directed flange or series of lugs 62, and the inner metal portion 28 of the valve stem is provided with an inwardly turned flange or lugs 64 which engage behind the flange or lugs 62 formed on the extension 54. This arrangement of parts gives the valve plug 50 a rotatable mounting on the valve stem and also permits the valve 50 to move inwardly of the valve stem by compressing the spring 58. The tubular extension 54 of the valve plug 50, is formed with a plurality of laterally directed ports 68 which connect the bore of the valve stem with the ports 20 and 22 when the valve plug 50 is off its seat 18.

It is believed that the operation of our improved valve will be evident from the foregoing description. However, briefly reviewing the operation, to inflate the safety tube 10 the valve stem is rotated to move it axially out of the valve casing a sufficient amount to lift the valve plug 50 off the valve seat 18. Air or other fluid supplied to the valve stem passes through the bore of the stem, out of the ports 68, down between the valve plug 50 and the seat 18, out of the port 20 into the chamber A, and out of the port 22 through the passage 24 and into the chamber B. After the tube 10 has been inflated to the desired amount the valve stem is rotated back in the opposite direction to positively engage the plug 50 with the valve seat 18. Once the plug 50 engages with the valve seat further rotation of the valve plug 50 is prevented by the friction between the valve plug and its seat. However, the valve stem is still turned into the valve casing which effects relative rotary movement between the inner metal portion 28 of the valve stem and the valve plug. This continued turning of the valve stem causes the tubular extension 54 of the valve plug 50 to move inwardly of the counterbore 56 and compresses the spring 58. The valve stem is turned or screwed into the valve casing until the flange 62 on the tubular extension 54 strikes the end of the inner metal portion 28 of the valve stem. At this time the valve plug 50 is very tightly down on the valve seat 18 and the valve stem cannot be rotated further. Also, the spring 58 is compressed to the greatest possible degree. Thus, the valve plug is held down upon its seat by a combined positive means and spring compression so that the most excessive type of vibration will not, even when greatly prolonged, loosen or affect the seal between the valve plug and its seat.

It will be noted that when the valve plug 50 is down upon the seat 18 a ring seal is formed between the ports 20 and 22 of the valve and that a second ring seal is formed between the port 22 and the valve stem. Therefore, the chambers A and B of the safety tube 10 are sealed from each other, and the tube and valve structure is particularly adapted for use where this is advisable, as, for example, in an airplane tire.

To open the valve for the purpose of inflating or deflating the safety tube the valve stem is turned out of the valve casing in the manner heretofore described.

From the foregoing it will be recognized that the objects of our invention have been achieved by the provision of a particularly practical, positive, and long wearing valve for use with plural-chambered or other tubes or tires. The valve plug is held against its seat during the sealing operation by positive pressure which compresses the spring means. The spring means serve to hold the plug and its seat together, even though vibration should partially loosen the positive pressure screw means. Wear on the rubber-covered surface of the valve plug is substantially eliminated by mounting the plug rotatably upon the valve stem. Further, the relatively short inner metal portion of the valve stem and the still shorter tubular extension of the valve casing substantially prevents separation of the valve from the safety tube even upon rotation of a deflated safety tube in a tire or rim or wheel. The short metal portions permit the valve stem to pull through the valve stem hole in a metal wheel or rim mounting the safety tube and tire, and the rubber connecting portion 32 facilitates this, generally, without the valve stem being torn from the tube.

While, in accordance with the Patents Statutes, we have specifically illustrated and described one best-known embodiment of our invention, it should be particularly understood that we are not to be limited thereto or thereby, but that the scope of our invention is defined in the appended claims.

We claim:

1. A valve for use with a plural-chambered tube, or the like and comprising a valve casing, a conical valve seat within the valve casing, said valve casing having a port extending laterally therethrough to approximately the middle of the valve seat and a port extending longitudinally to the small end of the valve seat, a valve stem received by the valve casing and adjustable axially therein, said valve stem including an inner metal portion, an outer metal portion and a rubber portion connecting said metal portions, a valve plug adapted to be removably engaged with the valve seat to seal the ports from each other and from the large end of the valve seat, and means rotatably mounting the valve plug on the inner end of the inner metal portion of the valve stem so that the valve plug may yield resiliently in an axial direction, said valve stem and valve plug having associated passages for supplying fluid to or from the ports when the valve plug is off its seat.

2. A valve for use with plural-chambered rubber inner tubes for pneumatic tires, or the like, and comprising a valve casing, a seat in the valve casing, said casing having a plurality of ports extending to the valve seat, a reciprocable valve plug adapted to engage with the seat and seal off the ports from each other, valve stem means for resiliently supporting the valve plug and for passing fluid to a position adjacent the valve plug, and means for positively moving the valve stem means axially towards the valve seat to engage the valve plug on the valve seat and compress the resilient support therefor.

3. A valve for use with plural-chambered tubes, and the like, and comprising a valve casing, a valve seat in the valve casing, a valve stem, means for positively moving the valve stem into the valve casing, a valve plug, means rotatably mounting the valve plug on the end of the valve stem, said last-named means including a compression spring normally urging the valve plug outwardly of the valve stem but adapted to yield resiliently and allow the valve plug to move bodily closer to the valve stem when the valve plug is forced into engagement with the valve seat upon movement of the valve stem into the valve casing, said valve stem and valve plug having associated passages for supplying fluid to or from a position adjacent the valve seat.

4. A valve for use with a plural-chambered safety tube, or the like, and comprising a valve casing, a conical valve seat in the casing, a hollow valve stem including an inner metal portion having threaded engagement with the casing, an outer metal portion and a rubber portion connecting said metal portions, a conical valve plug adapted to engage with the valve seat, said plug having a tubular extension at its larger end which is slidably received within a counterbore in the inner metal portion of the valve stem, a compression spring received within the counterbore and engaging with the end of the tubular extension, means on the inner metal portion of the valve stem engaging with the tubular extension and supporting it for rotatable movement and for axial movement against the compression spring, said tubular extension having lateral ports therein, and a gasket sealing means between the valve casing and the inner metal portion of the valve stem.

BOYD C. EBERHARD.
SELDEN T. WILLIAMS.